United States Patent [19]

Katoh

[11] Patent Number: 5,571,582
[45] Date of Patent: Nov. 5, 1996

[54] GARBAGE BAG OR CONTAINER

[75] Inventor: Masahiko Katoh, Yokkaichi, Japan

[73] Assignee: Mitsubishi Chemical Corporation, Tokyo, Japan

[21] Appl. No.: 369,334

[22] Filed: Jan. 6, 1995

Related U.S. Application Data

[63] Continuation of Ser. No. 88,036, Jul. 6, 1993, abandoned.

[30] Foreign Application Priority Data

Jul. 8, 1992 [JP] Japan ................... 4-203197

[51] Int. Cl.$^6$ ........................ B32B 1/08
[52] U.S. Cl. ............... 428/35.5; 428/35.7; 428/35.2; 428/905; 525/240; 525/232; 525/241; 525/223; 524/291; 524/528; 524/533; 524/534
[58] Field of Search ............... 428/35.2, 35.7, 428/35.5, 905; 525/240, 232, 240, 241, 223; 524/291, 528, 533, 534

[56] References Cited

U.S. PATENT DOCUMENTS

| | | | |
|---|---|---|---|
| 4,555,015 | 11/1985 | Haase | 206/0.5 |
| 4,961,929 | 10/1990 | Gurvich et al. | 464/196.1 |
| 5,342,862 | 8/1994 | Reich | 523/125 |

FOREIGN PATENT DOCUMENTS

| | | |
|---|---|---|
| 3-66759 | 3/1991 | Japan . |
| 3-153601 | 7/1991 | Japan . |

*Primary Examiner*—Paul J. Thibodeau
*Assistant Examiner*—Mary Critharis
*Attorney, Agent, or Firm*—Oblon, Spivak, McClelland, Maier & Neustadt, P.C.

[57] ABSTRACT

The present invention relates to a container or bag for garbage which repels animals such as cats, dogs, rats, and crows. The article is made from a composition comprising a polyolefin having 10 to 7000 ppm by weight of a compound selected from methyl salicylate, ethyl salicylate, propyl salicylate, n-butyl salicylate, iso-butyl salicylate, iso-amyl salicylate, and menthol.

8 Claims, No Drawings

GARBAGE BAG OR CONTAINER

This application is a Continuation of application Ser. No. 08/088,036, filed on Jul. 6, 1993, now abandoned.

BACKGROUND OF THE INVENTION

The present invention relates to a synthetic resin composition which continue to shed for relatively long time such odor that keep off fur and feather for example cats, dogs, rats, crows etc. especially cats and dogs and which can be easily shaped into garbage bags and containers.

Number of repellents for fur and feather have been presented but none of them is satisfactory both in effect and cost. In addition in most cases they are used in either of the following method. Namely they are impregnated into some powdery support and spreaded or they are sprayed directly on the articles. And manufacturing shaped articles having a repellent effect by shaping a synthetic resin containing a repellent has not been put into practice.

In many cities the disposal of garbage from each home is carried out as follows. The garbage is put into polyethylene garbage bag designated by the city in each home and placed in the designated place outside on the appointed day and these garbage bags are then collected by the garbage trucks of the city.

This conventional way of disposal has a problem that garbage bags left outside are often ripped by animals like cats and dogs before garbage trucks collect them and that garbage are scattered.

Also, there were some incidents that the insulator of electric cable made from synthetic resin laid in the ceiling or under the floor was bit by rats and that leakage of electricity or short-circuit was taken place.

Thus it is a prime object of this invention to provide a synthetic resin composition which can be easily shaped into garbage bags, containers, insulator of electric cable etc. and which are not unpleasant for man but have an enough repellent effect for fur and feather.

SUMMARY OF THE INVENTION

The synthetic resin composition of this invention contains 10 to 7000 ppm by weight of at least one compound selected from a group consisting of ester of salicylic acid such as methyl salicylate, ethyl salicylate, propyl salicylate, n-butyl salicylate, iso-butyl salicylate and iso-amyl salicylate, menthol and camphor.

Although there is no restriction for a synthetic resin used in this invention, polyolefins such as polyethylene, polypropylene, ethylene/vinyl acetate copolymer, ethylene/acrylic acid ester copolymer and poly(1-butene) that are used for manufacturing daily necessities such as garbage bags and containers are preferable. The synthetic resin composition of this invention can be shaped into various shaped articles such as bags, bottles etc. by various method for example extrusion, injection and blow molding.

The inventor found out that fur and feather such as cats, dogs, rats and crows dislike particular odor of ester of salicylic acid, menthol and camphor. And in this invention using this characteristic, a repellent effect is given to shaped articles by incorporating these odorants into the synthetic resin for shaping beforehand which is effective for preventing fur and feather from ripping these articles in use.

It was found that the repellent effect was observed if shaped articles contained more than 1 ppm by weight of these odorants, but it is necessary that more than 10 ppm by weight of these odorants are contained in the composition for shaping in consideration of the loss during shaping. And from the view point of obtaining an enough and durable repellent effect the concentration of these odorants should be high, but if the concentration is higher than 7000 ppm bleeding may occur. So to obtain the best result, the concentration is preferably 10 to 5000 ppm by weight in the composition.

If an elastomer preferably miscible with these odorants or a filler preferably having ability to adsorb these odorants are added to the synthetic resin composition of this invention, slow and prolonged shedding of the odorants is expected, which means that the shaped articles comprising of the composition can keep off cats and dogs for the longer time.

If the concentration of the elastomer is lower than 1% by weight, prolonged shedding is not expected and even if the concentration is higher than 50% by weight, the duration of shedding is not improved any more.

Also if the concentration of the filler is lower than 0.1% by weight, prolonged shedding is not expected and even if the concentration is higher than 60% by weight, the duration of shedding is not improved any more.

Also if ethylene/vinyl acetate copolymer or ethylene/acrylic acid ester copomymer having lower cristallinity than homopolymer is used as base resin of the composition of this invention, the slow and prolonged shedding of the odor is expected.

DETAILED DESCRIPTION OF PREFERRED EMBODIMENTS

Several garbage bags were formed from the synthetic resin composition of this invention according to the procedure described in Example 1~Example 11 and the field tests were carried out to investigate whether these bags kept off cats, dogs and crows.

(Example 1)

Methyl salicylate was employed as the odorant and incorporated into polyethylene pellets as follows. Small amount of methyl salicylate (produced by Wako Pure Chemical Industry Ltd.) was added dropwise to small amount of pellets of linear low density polyethylene (LLDPE) ("Mitsubishi Polyethy LL UF331", trade name, sold by Dia Polymer Co., Ltd.) and these pellets were left for several hours until methyl salicylate was impregnated into the pellets. Then thus treated pellets were mixed with untreated pellets so that the concentration of methyl salicylate was 10 ppm by weight.

Then these mixed pellets were formed into blown film 25 cm in diameter and 30 micron in thickness by inflation processing at 180° C. This film was cut into 40 cm pieces and formed into bags by bottom sealing.

The determination of the concentration of methyl salicylate in the film was carried out by head space gas chromatography and found to be 7 ppm by weight.

(Example 2)

Example 1 was repeated but with the following difference. The concentration of methyl salicylate in the pellet was controlled to be 1000 ppm by weight.

The concentration of methyl salicylate in the film was found to be 960 ppm by weight.

(Example 3)

Example 1 was repeated using ethyl salicylate (produced by Wako Pure Chemical Industry Ltd.) in place of methyl salicylate.

The concentration of ethyl salicylate in the film was found to be 8 ppm by weight.

(Example 4)

Example 3 was repeated but with the following difference. The concentration of ethyl salicylate in the pellet was controlled to be 1000 ppm by weight.

The concentration of ethyl salicylate in the film was found to be 950 ppm by weight.

(Example 5)

Small amount of high pressure low density polyethylene (HPLDPE) pellets ("Mitsubishi Polyethy LD LF540B", trade name, sold by Dia Polymer Co., Ltd.) were soaked into liquid menthol ("Menthol RA", trade name, sold by Takasago International Corporation) at room temperature for 24 hours so that the pellets impregnated with menthol. These treated pellets were mixed with untreated pellets so that the concentration of menthol in the mixed pellets was 10 ppm by weight. These mixed pellets were formed into bags according to the procedure described in Example 1.

The concentration of menthol in the film was found to be 6 ppm by weight by head space gas chromatography.

(Example 6)

Example 5 was repeated but with the following difference. The concentration of menthol in the pellet was controlled to be 1000 ppm by weight.

The concentration of menthol in the film was found to be 770 ppm by weight.

(Example 7)

Example 5 was repeated but with the following differences. Propyl salicylate was used in place of menthol and the concentration of propyl salicylate in the pellet was controlled to be 1000 ppm by weight.

The concentration of propyl salicylate in the film was found to be 950 ppm by weight.

(Example 8)

Example 5 was repeated but with the following differences. As the odorant n-butyl salicylate was added in place of menthol and the concentration of n-butyl salicylate in the pellet was controlled to be 1000 ppm by weight.

The concentration of n-butyl salicylate in the film was found to be 980 ppm by weight.

(Example 9)

Example 5 was repeated but with the following difference. As the odorant iso-butyl salicylate (produced by Wako Pure Chemical Industry Ltd.) was added in place of menthol and the concentration of iso-butyl salicylate in the pellet was controlled to be 1000 ppm by weight.

The concentration of iso-butyl salicylate in the film was found to be 980 ppm by weight.

(Example 10)

Example 5 was repeated but with the following difference. As the odorant iso-amyl salicylate (produced by Wako Pure Chemical Industry Ltd.) was added in place of menthol and the concentration of iso-amyl salicylate in the pellet was controlled to be 1000 ppm by weight.

The concentration of iso-amyl salicylate in the film was found to be 990 ppm by weight.

(Example 11)

Camphor was incorporated into LLDPE pellets, the same grade as used in Example 1, as follows. Small amount of camphor (produced by Wako Pure Chemical Industry Ltd.) was dissolved in diethyl ether and sprayed on small amount of the pellets. Then diethyl ether was eliminated by air-drying at room temperature and the pellets coated with small amount of camphor were prepared. The concentration of camphor was controlled to be 10 ppm by weight in the pellets. Thus obtained treated pellets were formed into film in the same manner described in Example 1.

The concentration of camphor in the film was found to be 5 ppm by weight.

(Example 12)

Example 1 was repeated but with the following differences. High density polyethylene (HDPE) ("Mitsubishi Polyethy HD", trade name, sold by Dia Polymer Co., Ltd.) was used in place of LLDPE and the concentration of methyl salicylate in the pellet was controlled to be 1000 ppm by weight.

The concentration of methyl salicylate in the film was found to be 950 ppm by weight.

Several bags for Comparative Example (Co. Ex.) were processed according to the procedure described bellow in order to confirm the characteristic of the bags of above examples.

(Co. Ex. 1)

Example 1 was repeated using untreated pellets only and the bags containing no odorant were processed.

(Co. Ex. 2)

Example 5 was repeated using untreated pellets only and the bags containing no odorant were processed.

(Co. Ex. 3)

Example 12 was repeated using untreated pellets only and the bags containing no odorant were processed.

The field tests were carried out as follows.

In each test one or two bags according to this invention and one bag for comparative example were used. One raw fish and 100 grams of pork were put into each bag and the open end was bound tightly. These bags were left in the field close to each other where cats and crows appeared frequently and it was investigated that how many days passed before they were ripped by cats or crows. This test was carried out 7 times.

The bags used for each test were as follows.

Test 1: Example 1, Example 2, Co. Ex. 1
Test 2: Example 3, Example 4, Co. Ex. 1
Test 3: Example 5, Example 6, Co. Ex. 2

Test 4: Example 7, Example 8, Co. Ex. 2
Test 5: Example 9, Example 10, Co. Ex. 2
Test 6: Example 11, Co. Ex. 1
Test 7: Example 12, Co. Ex. 3
The results of the field tests are summarized in Table 1.

TABLE 1

| | Composition of Bag | | Result on nth Day | | | | | | |
|---|---|---|---|---|---|---|---|---|---|
| | Base Resin | Odorant (ppm in the film) | 1 | 2 | 3 | 4 | 5 | 6 | 7 |
| Example 1 | LLDPE | methyl salicylate (7) | O | O | x | | | | |
| Example 2 | LLDPE | methyl salicylate (960) | O | O | O | O | O | O | O |
| Example 3 | LLDPE | ethyl salicylate (8) | O | x | | | | | |
| Example 4 | LLDPE | ethyl salicylate (950) | O | O | O | x | | | |
| Example 5 | HPLDPE | menthol (6) | O | x | | | | | |
| Example 6 | HPLDPE | menthol (770) | O | O | O | x | | | |
| Example 7 | HPLDPE | propyl salicylate (950) | O | O | O | x | | | |
| Example 8 | HPLDPE | n-butyl salicylate (980) | O | O | x | | | | |
| Example 9 | HPLDPE | iso-butyl salicylate (980) | O | O | x | | | | |
| Example 10 | HPLDPE | iso-amyl salicylate (990) | O | O | O | x | | | |
| Example 11 | LLDPE | camphor (5) | O | O | O | x | | | |
| Example 12 | HDPE | methyl salicylate (950) | O | O | O | x | | | |
| Co. Ex. 1 | LLDPE | none | x | | | | | | |
| Co. Ex. 2 | HPLDPE | none | x | | | | | | |
| Co. Ex. 3 | HDPE | none | x | | | | | | |

In Table 1 the result that the bag of each Example and comparative example was ripped (x) or was not ripped (O) was described in the right column with the passage of days. For example it is shown that the bag of Example 1 was not ripped on the first and the second day but ripped on the third day from the start. The data in Table 1 show that none of the bags of Example 1~Example 12 was ripped on the first day. And data obtained on Example 2, Example 4 and Example 6 show that bags containing larger amount of odorant were not ripped for longer time than those bags containing smaller amount of the same odorant.

On the other hand the bags of Comparative Example 1 used in Test 1, Test 2 and Test 6, the bags of Comparative Example 2 used in Test 3, Test 4 and Test 5 and the bag of Comparative Example 3 used in Test 7 were all ripped on the first day.

These results show clearly that the garbage bag processed from the synthetic resin film containing ester of salicylic acid, menthol or camphor as odorants can keep off cats and crows effectively.

Then the reaction test described bellow using a pet dog was carried out in order to confirm the effect of the composition of this invention as a dog repellent. The bags of Example 1, Example 3, Example 5, Example 11 and Comparative Example 1 were used in these tests.

The contents of canned dog food on the market were put into each bag and the open end was bound tightly. These bags were placed in front of the pet dog and the reaction was observed.

The results of this reaction test are summarized in Table 2.

TABLE 2

| | Composition of Bag | | |
|---|---|---|---|
| | Base Resin | Odorant (ppm in the film) | Reaction of the Dog |
| Example 1 | LLDPE | methyl salicylate (7) | not approached |
| Example 3 | LLDPE | ethyl salicylate (8) | not approached |
| Example 5 | HPLDPE | menthol (6) | not approached |

TABLE 2-continued

| | Composition of Bag | | |
|---|---|---|---|
| | Base Resin | Odorant (ppm in the film) | Reaction of the Dog |
| Example 11 | LLDPE | camphor (5) | not approached |
| Co. Ex. 1 | LLDPE | none | tried to rip |

The data in Table 2 show that the dog tried to rip the bag processed from the polyethylene film containing no odorant (Comparative Example 1) in order to eat the contents, but it did not even get near to the bags of Example 1, Example 3, Example 5 and Example 11.

These results show that the garbage bag processed from the synthetic resin film containing ester of salicylic acid, menthol and camphor as odorants can keep off dogs effectively.

(Example 13~Example 16)

Then the following experiments were carried out in order to confirm the effect of the synthetic resin composition of this invention as a rat repellent.

20 parts by weight of methyl salicylate was added dropwise to 80 parts by weight of pellet of ethylene/vinyl acetate copolymer (E/VAC) ("Mitsubishi Polyethy EVA V601S", trade name, sold by Dia Polymer Co., Ltd.) and left for 24 hours at room temperature so that methyl salicylate was impregnated into E/VAC pellets. In the same manner three kinds of E/VAC pellets containing 20% by weight of ethyl salicylate, iso-butyl salicylate and liquid menthol respectively were prepared.

Then 2.5 parts by weight of these treated pellets were mixed respectively with 97.5 parts by weight of polypropylene pellets (PP) ("Mitsubishi Polypro", trade name, sold by Dia Polymer Co., Ltd.). These mixed pellets were extruded and pelletized. Thus obtained homogenized compositions were formed into strips of sheet 1 mm in thickness and 20 mm in width by compression molding.

(Co. Ex. 4)

In the same manner described in Example 13~Example 16, strips of sheet were prepared using PP and E/VAC containing no odorant.

The effect as a rat repellent was investigated as follows. Several rattraps with food were placed in the ceiling of a farmhouse full of rats and the number of rats caught by each rattrap was counted. In these tests strips prepared in Example 13~Example 16 and Comparative Example 4 were fixed around the entrance of each rattrap. These rattraps were left in the ceiling for 1 week.

The place of each rattrap was changed occasionally during 1 week.

The results are shown in Table 3.

TABLE 3

| | Composition of Sheet | | |
|---|---|---|---|
| | Base Resin | Odorant (ppm in the Sheet) | No. of Rat Caught during 1 Week |
| Example 13 | PP | methyl salicylate (4700) | 0 |
| Example 14 | PP | ethyl salicylate (4600) | 0 |
| Example 15 | PP | iso-butyl salicylate (4700) | 0 |
| Example 16 | PP | menthol (4500) | 0 |
| Co. Ex. 4 | PP | none | 4 |

No rat was caught in any of the rattraps equipped with the strips of this invention and this shows that the synthetic resin composition of this invention have rat repellant effect.

The following Example 17~Example 25 relate to the synthetic resin compositions to attain slow and prolonged shedding of the odor. As shown in Table 4, in Example 17 and Example 18 ethylene copolymers of lower crystallinity were employed as base resin of the compositions and in Example 19~Example 25, elastomers miscible with the odorants or fillers adsorptive to the odorants were incorporated into the synthetic resin compositions.

(Example 17)

Methyl salicylate was added dropwise to small amount of the pellets of ethylene/vinyl acetate copolymer (E/VAC) ("Mitsubishi Polyethy EVA V103H", trade name, VAC content: 2% by weight, sold by Dia Polymer Co., Ltd.) and left for several hours at room temperature so that methyl salicylate was impregnated into E/VAC pellets. Then thus treated pellets were mixed with untreated pellets so that the concentration of methyl salicylate was 1000 ppm by weight.

Then these mixed pellets were formed into blown film 25 cm in diameter and 30 micron in thickness by inflation processing at 180° C.

(Example 18)

Example 17 was repeated using ethylene/ethyl acrylate copolymer (E/EA) (containing 20% by weight of EA) in place of E/VAC.

(Example 19)

Example 17 was repeated using polymer blend of 90% by weight of HDPE same as HDPE used in Example 12 and 10% by weight of ethylene/propylene rubber (EPR) in place of E/VAC.

(Example 20)

Example 17 was repeated using polymer blend of 90% by weight of HDPE and 10% by weight of very low density polyeththylene (V-LDPE) ("Yukalon SELL X142", trade name, produced by Mitusbishi Petrochemical Co., Ltd.) in place of E/VAC.

(Example 21)

Example 17 was repeated using polymer blend of 90% by weight of polypropylene and 10% by weight of hydogenated styrene/butadiene block copolymer (SEBS) in place of E/VAC.

(Example 22)

Example 17 was repeated using polymer blend of 90% by weight of HDPE and 10% by weight of polybutadiene in place of E/VAC.

(Example 23)

Diethyl ether solution of 10% by weight of methyl salicylate was sprayed on small amount of powdery diatomaceous earth ("Celite 545", trade name). Diethyl ether was eliminated by air-drying at room temperature and diatomaceous earth which coated with methyl salicylate was prepared. This diatomaceous earth was added to HDPE pellets in a concentration of 10% by weight and mixed. This mixture was diluted with HDPE and pelletized so that the concentration of methyl salicylate in the pellets was controlled to be 1000 ppm by weight.

Then these mixed pellets were formed into blown film 25 cm in diameter and 30 micron in thickness by inflation processing at 180° C.

(Example 24)

Example 23 was repeated using silica gel in place of diatomaceous earth.

(Example 25)

Example 23 was repeated using synthetic zeolite in place of diatomaceous earth.

In order to investigate the evaporation rate of the odorant in the film, film samples prepared in Example 17~25 were left outside for 1 week and the content of residual odorant was determined by head space gas chromatography and was compared with the original value.

The results are shown in Table 4.

In order to confirm the characteristic of Example 17~Example 25, the same test was carried out using the film of Comparative Example 5 and Comparative Example 6 prepared as follows. In Comparative Example 5 LLDPE film containing methyl salicylate and in Comparative Example 6 HDPE film containing methyl salicylate were formed according to the procedure described in Example 2 and Example 12 respectively. The results are summarized in Table 4.

TABLE 4

| | | | Change of Concentration of Methyl Salicylate (ppm by weight) | |
|---|---|---|---|---|
| | Composition of Film (% by weight) | | just after processing | after 1 week |
| Example 17 | E/VAC | | 960 | 180 |
| Example 18 | E/EA | | 940 | 210 |
| Example A | LLDPE | | 950 | 10 |
| Example 19 | HDPE + EPR | (10) | 930 | 170 |
| Example 20 | HDPE + V − LDPE | (10) | 920 | 190 |
| Example 21 | HDPE + SEBS | (10) | 940 | 210 |

TABLE 4-continued

| | Composition of Film (% by weight) | | Change of Concentration of Methyl Salicylate (ppm by weight) | |
|---|---|---|---|---|
| | | | just after processing | after 1 week |
| Example 22 | HDPE + polybutadiene | (10) | 940 | 120 |
| Example 23 | HDPE + diatomaceous earth | (10) | 930 | 480 |
| Example 24 | HDPE + silica gel | (10) | 920 | 620 |
| Example 25 | HDPE + synthetic zeolite | (10) | 950 | 340 |
| Example B | HDPE | | 940 | 5 |

The data in Table 4 show clearly that in case of film comprising of ethylene copolymers (Example 17 and Example 18) or the compositions incorpolated therein elastomers miscible with the odorant (Example 19~Example 22), the evaporation speed of the odorant decreased and slow and prolonged shedding of the odor was attained.

Also in case of the film comprising of the compositions containing adsorptive fillers (Example 23~Example 25), slow and prolonged shedding of the odor was attained.

In addition to elastomers mentioned above following elastomers such as ethylen/vinyl acetate copolymer, ethylene/ester of acrylic acid copolymer, ethylene/butene copolymer, ethylene/1-hexene copolymer, ethylene/1-octene copolymer, butadiene/styrene copolymer, isoprene/styrene copolymer and hydrogenated isoprene/styrene copolymer can be also used.

In addition to the fillers mentioned above, following fillers such as aluminium oxide, hydrotalcite, calcium carbonate, talc, natural zeolite, wollastonite, calcium sulfate, magnesium hydrooxide, aluminum hydrooxide, titanium dioxide and carbon black can be also used.

Although in all Examples illustrated above polyethylene and polypropylene were used as base resin of the compositions, any other resins can be usefully employed because repellent effect can be attained in so small amount of odorants that the original performance of the resin is not spoiled by addition of the odorant used in this invention.

Advantage of the Invention

As shown clearly by above illustrated Examples shaped articles comprising of the synthetic resin composition of this invention can be keep off dogs, cats, rats, crows etc. For instance garbage bags can keep of# dogs and cats for at least one day by the odor shedded from the bags. So if garbage is put into the garbage bags of this invention on the collection day and left outside, it is not ripped easily by dogs and cats before they are collected by garbage trucks.

And in case that the elastomer miscible with the odorants or adsorptive fillers are incorporated into the composition or in case that ethylene copolymers of low crystallinity are employed as base resin, slow and prolonged shedding of the odor is attained, and for this reason, shaped articles comprising of these compositions can keep off dogs, cats and rats for relatively long time even if they are left outside or laid in the ceiling.

What is claimed is:

1. A garbage bag or container for keeping off fur and feather comprising a polyolefin composition consisting essentially of:

i) a polyethylene;

ii) 10 to 5,000 ppm by weight of at least one compound selected from the group consisting of methyl salicylate, ethyl salicylate, propyl salicylate, n-butyl salicylate, iso-butyl salicylate, iso-amyl salicylate and menthol; and iii) 1 to 50% by weight of an elastomer miscible with said polyolefin selected from the group consisting of EPR, V-LDPE, SEBS, polybutadiene and a mixture thereof wherein ppm and % by weight are based on the entire weight of said polyolefin composition.

2. A garbage bag or container for keeping off fur and feather comprising a polyolefin composition consisting essentially of:

i) a polyethylene;

ii) 10 to 5,000 ppm by weight of at least one compound selected from the group consisting of methyl salicylate, ethyl salicylate, propyl salicylate, n-butyl salicylate, iso-butyl salicylate, iso-amyl salicylate and menthol; and iv) 1 to 60% by weight of a filler wherein ppm and % by weight are based on the entire weight of said polyolefin composition.

3. The garbage bag of claim 2 wherein said filler is selected from the group consisting of aluminum oxide, hydrocalcite, calcium carbonate, talc, natural zeolite, wollastonite, calcium sulfate, magnesium hydroxide, aluminum hydroxide, titanium dioxide, carbon black, diatomaceous earth, silica gel, a synthetic zeolite and a mixture thereof.

4. The garbage bag of claim 2 wherein said filler is selected from the group consisting of diatomaceous earth, silica gel, a synthetic zeolite and a mixture thereof.

5. A garbage bag or container for keeping off fur and feather comprising a polyolefin composition consisting essentially of:

i) a polyethylene;

ii) 10 to 5,000 ppm by weight of at least one compound selected from the group consisting of methyl salicylate, ethyl salicylate, propyl salicylate, n-butyl salicylate, iso-butyl salicylate, iso-amyl salicylate and menthol;

iii) 1 to 50% by weight of an elastomer miscible with said polyolefin selected from the group consisting of EPR, V-LDPE, SEBS, polybutadiene and a mixture thereof; and iv) 1 to 60% by weight of a filler wherein ppm and % by weight are based on the entire weight of said polyolefin composition.

6. The garbage bag of claim 5 wherein said filler is selected from the group consisting of aluminum oxide, hydrocalcite, calcium carbonate, talc, natural zeolite, wollastonite, calcium sulfate, magnesium hydroxide, aluminum hydroxide, titanium dioxide, carbon black, diatomaceous earth, silica gel, a synthetic zeolite and a mixture thereof.

7. The garbage bag of claim 5 wherein said filler is selected from the group consisting of diatomaceous earth, silica gel, a synthetic zeolite and a mixture thereof.

8. A garbage bag or container for keeping off fur and feather comprising a polyolefin composition consisting essentially of:

i) a polyolefin selected from the group consisting of ethylene/vinyl acetate copolymer and ethylene/acrylic acid ester copolymer; and ii) 10 to 5,000 ppm by weight of at least one compound selected from the group consisting of methyl salicylate, ethyl salicylate, propyl salicylate, n-butyl salicylate, iso-butyl salicylate, iso-amyl salicylate and menthol, wherein ppm and % by weight are based upon the entire weight of said polyolefin composition.

\* \* \* \* \*